(12) United States Patent
Burkholder

(10) Patent No.: US 8,112,360 B2
(45) Date of Patent: Feb. 7, 2012

(54) DIGITAL MEDIA ACQUISITION USING CREDIT

(75) Inventor: Thomas Burkholder, Vancouver (CA)

(73) Assignee: Apple Inc., Cupertino, CA (US)

( * ) Notice: Subject to any disclaimer, the term of this patent is extended or adjusted under 35 U.S.C. 154(b) by 1398 days.

(21) Appl. No.: 11/437,111

(22) Filed: May 18, 2006

(65) Prior Publication Data

US 2007/0271188 A1    Nov. 22, 2007

(51) Int. Cl.
*G06F 21/00* (2006.01)
(52) U.S. Cl. ............. 705/52; 705/50; 705/51; 705/14.1; 705/14.11; 705/26.1
(58) Field of Classification Search .............. 705/50–79, 705/14.1, 14.11, 26.1
See application file for complete search history.

(56) References Cited

U.S. PATENT DOCUMENTS

| | | | |
|---|---|---|---|
| 6,226,618 B1 * | 5/2001 | Downs et al. ................... | 705/1 |
| 2004/0215534 A1 | 10/2004 | Gautier et al. | |
| 2005/0021400 A1 * | 1/2005 | Postrel ........................... | 705/14 |
| 2005/0021478 A1 | 1/2005 | Gautier et al. | |
| 2006/0212401 A1 | 9/2006 | Ameerally et al. | |
| 2007/0198418 A1 * | 8/2007 | Macdonald et al. ............ | 705/52 |

OTHER PUBLICATIONS

"iTunes Music Store Customer Service—Song Code Questions", www.apple.com/support/itunes/musicstore/songcode, downloaded Mar. 11, 2006, pp. 1-3.
"Sending an iTunes gift in the iTunes Music Store", http://docs.info.apple.com/article.html?artnum=302534, downloaded Mar. 11, 2006, pp. 1-4.
"iTunes Music Store Customer Service—Gift Questions", www.apple.com/support/itunes/musicstore/gift, downloaded Mar. 11, 2006, pp. 1-2.
"iTunes Music Store Customer Service—iTunes Music Card Questions", www.apple.com/support/itunes/musicstore/musiccard, downloaded Mar. 11, 2006, pp. 1-2.
"iTunes Music Store Customer Service—Gift Certificate Questions", www.apple.com/support/itunes/musicstore/giftcertificate, downloaded Mar. 11, 2006, pp. 1-2.
"Gifting, Gift Certificates, and iTunes Music Cards", www.apple.com/ilife/tutorials/itunes/it3-7.html, downloaded Mar. 11, 2006, p. 1.
"iTunes Music Store: How to Redeem a Free Song Credit", http://docs.info.apple.com/articles.html?artnum=302264, downloaded Mar. 11, 2006, p. 1.
"iTunes Music Store: How to Redeem an iTunes Music Card", http://docs.info.apple.com/article.html?artnum=301958, downloaded Mar. 11, 2006, pp. 1-2.

* cited by examiner

*Primary Examiner* — Mamon Obeid

(57) ABSTRACT

Improved techniques and systems to facilitate use of credit to acquire digital media assets from a network-based media server are disclosed. Digital media assets can include media items such as songs, albums, images, slideshows, audiobooks, podcasts, or videos. A user can acquire credit in a variety of different ways including, for example, through redeeming a credit invitation. Once a user has available credit by whatever means, the user can acquire one or more digital media assets from the network-based media server using his/her available credit. In one embodiment, the credit is provided as item credits, whereby each item credit can be used to acquire a selected digital media asset. However, not all of the digital media assets available from the network-based media server are permitted to be acquired using item credits. In some cases, the digital media assets that can be acquired with credit can be designated by their cost. The country of origin of the user and/or the type of media asset can also influence the digital media assets that can be acquired using item credits.

13 Claims, 8 Drawing Sheets

| UID | MEDIA TYPE | PRICE | COUNTRY | ITEM CREDIT AVAILABLE? |
|---|---|---|---|---|
| XXX | ALBUM | 9.99 | USA | NO |
| XXX | SONG | 0.99 | USA | YES |
| XXX | ALBUM | 1499 | JAPAN | NO |
| XXX | SONG | 149 | JAPAN | YES |
| XXX | SONG | 179 | JAPAN | YES |
| XXX | SONG | 249 | JAPAN | NO |

FIG. 2B

DIGITAL MEDIA ACQUISITION USING CREDIT

CROSS-REFERENCE TO RELATED APPLICATIONS

This application is related to co-pending U.S. patent application Ser. No. 11/082,207, entitled "METHOD AND SYSTEM FOR NETWORK-BASED PROMOTION OF PARTICULAR DIGITAL MEDIA ITEMS", filed on Mar. 15, 2005, which is incorporated herein by reference in its entirety for all purposes. This application is also related to co-pending U.S. patent application Ser. No. 10/688,213, entitled "METHOD AND SYSTEM FOR NETWORK-BASED ALLOWANCE CONTROL", filed on Oct. 15, 2003, which is incorporated herein by reference in its entirety for all purposes. This application is also related to co-pending U.S. patent application Ser. No. 10/833,267, filed Apr. 26, 2004, and entitled "METHOD AND SYSTEM FOR NETWORK-BASED PURCHASE AND DISTRIBUTION OF MEDIA", which is incorporated herein by reference in its entirety for all purposes.

BACKGROUND OF THE INVENTION

1. Field of the Invention

The present invention relates to media acquisition and, more particularly, to acquisition of digital media assets in a client-server environment.

2. Description of the Related Art

Today, an online media store, such as the iTunes Music Store® offered by Apple Computer, Inc., allows music to be purchased using credit cards, prepayments or free song credits. With credit cards, as a song or album is purchased, the purchaser's credit card can be charged for the cost of the song or album. Prepayments can be provided to users by music cards (i.e., gift cards) or gift certificates. A recipient of a music card can redeem the music card for its credit value based on its face value denomination, such as $15, $25, $30 and $50, at the iTunes Music Store®. These music cards can be purchased at retailers as is commonly done with gift cards. The gift certificates are also able to be redeemed at the iTunes Music Store®. However, gift certificates purchased in United States may only be redeemed by residents of the United States. Once a music card or gift certificate has been redeemed, the associated dollar amount is credited to the user's account. Each time music is purchased from the iTunes Music Store®, the iTunes Music Store® reduces the credit in the user's account until fully depleted.

Free song credits can be provided by a card, a bottle cap and the like which include a song code. The song code is a code that is used when redeeming the card, bottle cap or the like for the free song credits from the iTunes Music Store®. Thereafter, as desired, the user can subsequently choose a song they would like to purchase from the iTunes Music Store®. When a song is to be purchased, the iTunes Music Store® will use any free song credit to pay for the song before using a credit card that is on file for the user. The free song credits can be stored for the user by the iTunes Music Store® until they are consumed or expire, whichever comes first. In addition, once the user has signed into their account, iTunes® can display the available free song credits for user. The iTunes Music Store® offers songs at $0.99 each, hence, the free song credits are only for the purchase of songs (i.e., not albums). Hence, the free song credits allow a user to purchase songs without having to pay for them.

Unfortunately, however, free song credits are only usable to purchase songs. When songs are offered for purchase at more than one price and at different prices and/or currency in different countries, there are complications in ensuring that the free song credits are properly used. Thus, there is a need for improved approaches to managing utilization of free credits at an online media store.

SUMMARY OF THE INVENTION

The invention relates to improved techniques and systems to facilitate use of credit to acquire digital media assets from a network-based media server. Digital media assets can include media items such as songs, albums, images, slideshows, audiobooks, podcasts, or videos. A user can acquire credit in a variety of different ways including, for example, through redeeming a credit invitation. Once a user has available credit by whatever means, the user can acquire one or more digital media assets from the network-based media server using his/her available credit. In one embodiment, the credit is provided as item credits, whereby each item credit can be used to acquire a selected digital media asset. However, not all of the digital media assets available from the network-based media server are permitted to be acquired using item credits. In some cases, the digital media assets that can be acquired with credit can be designated by their cost. The country of origin of the user and/or the type of media asset can also influence the digital media assets that can be acquired using item credits. The invention is particularly well suited for use with an online media store operating on a network-based media server coupled to a data network and that can serve multiple user requests provided via clients over the network.

The invention can be implemented in numerous ways, including as a method, system, device, apparatus, or computer readable medium. Several embodiments of the invention are discussed below.

As a method for acquiring a media item from an online media store using a credit, one embodiment of the invention includes at least the acts of: identifying a media item to be purchased by a purchaser, the media item having a purchase cost associated therewith; determining whether the media item is permitted to be acquired using an item credit based on at least the purchase cost; determining whether the purchaser has at least one item credit available at the online media store; and thereafter applying the item credit associated with the purchaser so as to reduce or eliminate the purchase cost of the media item when it is determined that the media item is permitted to be acquired using an item credit.

As a method for acquiring a media item at a local computing device, the media item being acquired from an online media store, one embodiment of the invention includes at least the acts of: receiving a user request via the local computing device to interact with the online media store to locate a particular media item; sending media item information concerning the particular media item to the local computing device; receiving a user request to acquire the particular media item; accessing a country of origin for the user that is purchasing the particular media item; accessing a cost for the particular media item; determining whether item credit can be used for the particular media item based on at least the cost for the particular media item and the country of origin for the user; accessing an amount of item credit available to the user; applying the item credit available to the user to reduce or eliminate the cost for the particular media item provided that it is determined that item credit can be used for the particular media item; and reducing the amount of item credit available to the user based on the item credit applied.

As a computer readable medium including at least computer program code for acquiring a digital media asset from a network-based media server using a credit, one embodiment of the invention includes at least: computer program code for identifying a digital media asset to be purchased by a purchaser, the digital media asset having a purchase cost associated therewith; computer program code for determining whether the digital media asset is permitted to be acquired using an item credit based on at least the purchase cost; computer program code for determining whether the purchaser has at least one item credit available at the network-based media server; and computer program code for thereafter applying the item credit associated with the purchaser so as to reduce or eliminate the purchase cost of the digital media asset when it is determined that the digital media asset is permitted to be acquired using an item credit.

As a computer readable medium for acquiring a media item at a local computing device, the media item being acquired from a network-based media server, one embodiment of the invention includes at least: computer program code for receiving a user request via the local computing device to interact with the network-based media server to locate a particular media item; computer program code for sending media item information concerning the particular media item to the local computing device; computer program code for receiving a user request to acquire the particular media item; computer program code for accessing a country of origin for the user that is purchasing the particular media item; computer program code for accessing a cost for the particular media item; computer program code for determining whether item credit can be used for the particular media item based on at least the cost for the particular media item and the country of origin for the user; computer program code for accessing an amount of item credit available to the user; computer program code for applying the item credit available to the user to reduce or eliminate the cost for the particular media item provided that it is determined that item credit can be used for the particular media item; and computer program code for reducing the amount of item credit available to the user based on the item credit applied.

Other aspects and advantages of the invention will become apparent from the following detailed description taken in conjunction with the accompanying drawings.

BRIEF DESCRIPTION OF THE DRAWINGS

The invention will be readily understood by the following detailed description in conjunction with the accompanying drawings, wherein like reference numerals designate like structural elements, and in which:

FIG. 2B is a diagram of a representative data table according to one embodiment of the invention.

DETAILED DESCRIPTION OF THE INVENTION

The invention pertains to improved techniques and systems to facilitate use of credit to acquire digital media assets from a network-based media server. Digital media assets can include media items such as songs, albums, images, slideshows, audiobooks, podcasts, or videos. A user can acquire credit in a variety of different ways including, for example, through redeeming a credit invitation. Once a user has available credit by whatever means, the user can acquire one or more digital media assets from the network-based media server using his/her available credit. In one embodiment, the credit is provided as item credits, whereby each item credit can be used to acquire a selected digital media asset. However, not all of the digital media assets available from the network-based media server are permitted to be acquired using item credits. In some cases, the digital media assets that can be acquired with credit can be designated by their cost. The country of origin of the user and/or the type of media asset can also influence the digital media assets that can be acquired using item credits. The invention is particularly well suited for use with an online media store operating on a network-based media server coupled to a data network and that can serve multiple user requests provided via clients over the network.

Embodiments of the invention are discussed below with reference to FIGS. 1-6. However, those skilled in the art will readily appreciate that the detailed description given herein with respect to these figures is for explanatory purposes as the invention extends beyond these limited embodiments.

Figure 1:
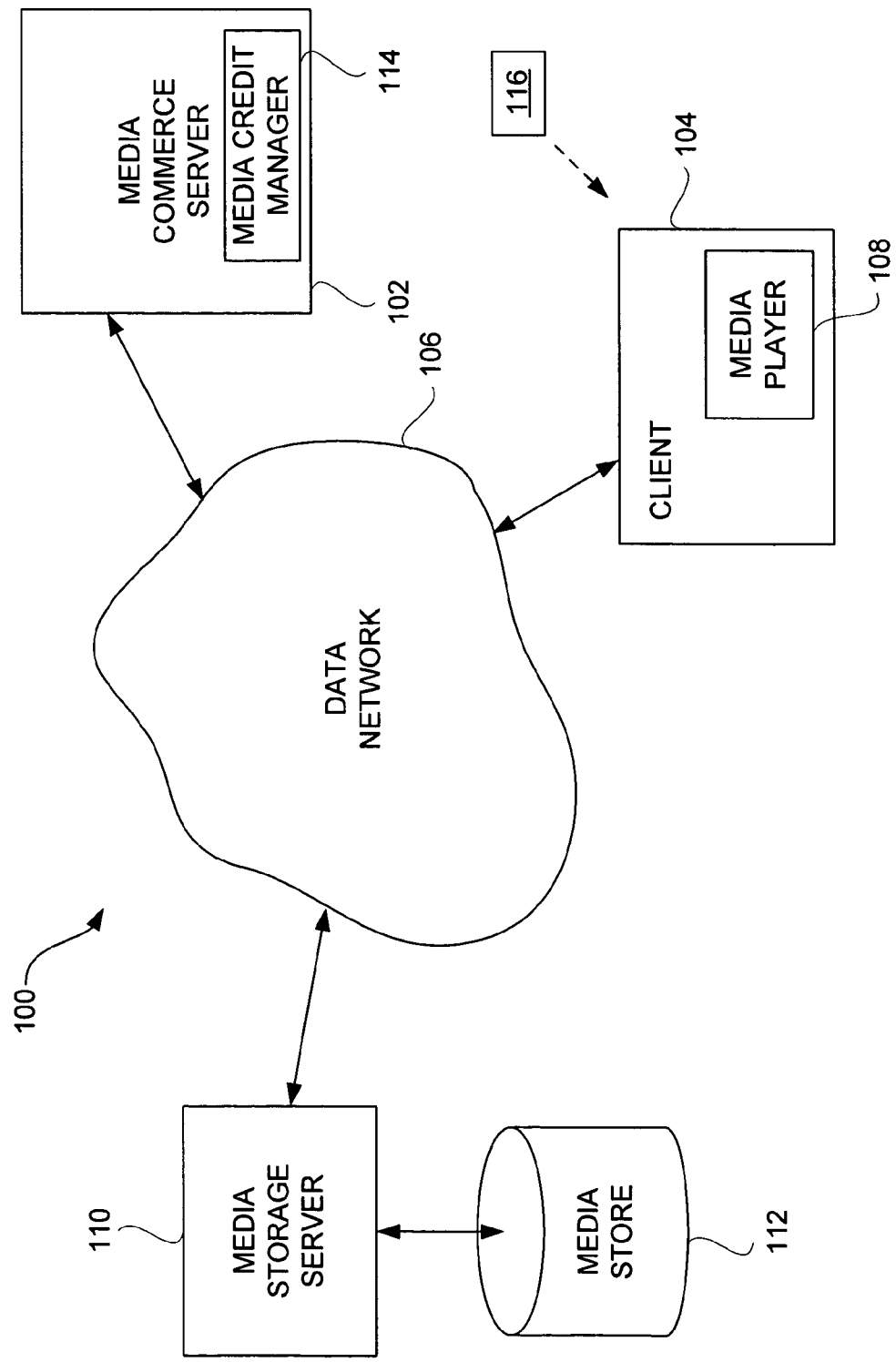
FIG. 1 is a block diagram of a media system including a digital media purchase system according to one embodiment of the invention.

FIG. 1 is a block diagram of a media system including a digital media purchase system 100 according to one embodiment of the invention. The digital media purchase system 100 includes a digital media commerce server 102. The digital media commerce server 102 coordinates review and/or acquisition (e.g., purchase) of digital media items through on-line transactions. The digital media purchase system 100 also includes a client 104. Typically, the media purchase system 100 would include a plurality of different clients 104, and each client 104 includes a digital media player 108. The digital media player 108 is an application program (e.g., specific software application or web browser program) that operates on the client 104.

The client 104 can couple to the digital media commerce server 102 through a data network 106. Hence, any of the clients 104 can interact with the media commerce server 102 to review and/or acquire media items. In one embodiment, the data network 106 includes at least a portion of the Internet. The clients 104 can vary with application but generally are computing devices that have memory storage. Often, the clients 104 are personal computers or other computing devices (e.g., PDA, portable media player, mobile telephone) that are capable of storing and presenting digital media to their users.

The digital media purchase system 100 also includes a digital media store 112. The digital media store 112 provides mass storage of the numerous digital media items that are accessible via the media purchase system 100. The digital media items can be accessed from the digital media store 112 over the data network 106 by way of the digital media commerce server 102.

More particularly, the digital media purchase system 100 allows a user of the client 104 to utilize the digital media player 108 to browse, search or sort through a plurality of digital media items that can be accessed (e.g., purchased)

from the media commerce server 102. The digital media player 108 may also allow the user to preview a digital media item of the digital media items. In the event that the user of the digital media player 108 desires to purchase a particular media item, the user (via the media player 108) and the media commerce server 102 engage in an on-line commerce transaction in which the user pays for access rights to the particular digital media item. In one embodiment, a credit card account associated with the user is debited for the purchase amount of the particular media item.

In the digital media purchase system 100, the digital media items are stored in the digital media store 112 and retrieved via the media commerce server 102. However, a separate digital media storage server 110 can, as shown in FIG. 1, be provided and coupled between the data network 106 and the digital media store 112. The benefit of such a digital media storage server 110 would be that the digital media commerce server 102 need not burden its resources to deliver the digital media items that may be purchased to the client 104. In particular, on purchasing a particular digital media item, the digital media commerce server 102 sends download information to the digital media player 108 on the client 104. The download information can then be used by the digital media player 108 (and the client 104) to retrieve the digital media content for the particular digital media item by interacting with the digital media storage server 110 through the data network 106. In this regard, the digital media storage server 110 obtains the digital media content corresponding to the particular digital media item from the digital media store 112 and downloads such content through the data network 106 to the client 104. The downloaded digital media content can then be stored on the client 104.

In one embodiment, the downloaded digital media content is encrypted as received at the client 104 but is decrypted and then re-encrypted before persistent storage on the client 104. Thereafter, the digital media player 108 can present (e.g., play) the digital media content at the client 104. In addition, digital media searching/browsing/playing or other processing may be performed by an application program operating on the client 104. The application program is, for example, the digital media player 108 illustrated in FIG. 1.

Here, in one example, the digital media commerce server 102 illustrated in FIG. 1 can also serve as the media storage server 110. However, these functions may be implemented in separate servers. The search request is a request to the remote digital media commerce server 102 to perform a search in accordance with the search criteria for a particular song or album. Here, the digital media commerce server 102 includes at least information (e.g., metadata) for a large number of digital media items that are available to be purchased from the digital media commerce server 102, though the content of the media items that are purchased may be acquired at the client 104 via download with respect to another remote server, such as the media storage server 110.

The digital media commerce server 102 can also include a media credit manager 114. However, it should be recognized that although not depicted in FIG. 1, the digital media commerce server 102 will include other components, blocks and functionality as is typically provided by a media server. Nevertheless, the media credit manager 114 can serve to manage the use of credits with respect to acquiring digital media items from the digital media commerce server 102. In other words, digital media assets can be acquired from the digital media commerce server 102. Typically, the digital media assets would be purchased for a cost. However, when the user has available credit, the purchase can be through use of credit. The media credit manager 114 operates to maintain credit amounts for users, determine when credit can be used, and can apply credit as appropriate.

The media system 100 illustrated in FIG. 1 can further utilize credit invitations 116. A user of the client 104 can receive a credit invitation 116 by a variety of different channels. As one example, the credit invitation 116 can be a physical card, such as a gift card, that is available for purchase at retail stores or available without cost as a promotional item. Instead of a card, as other examples, the credit invitation 116 can be a label, a bottle cap, a container, etc. Still further, the credit invitation 116 can be an electronic mail (email) message or text message. In any case, the credit invitation 116 includes a credit code. A user of the client 104 can redeem the credit associated with the credit invitation 116 by providing the credit code at the client 104. In particular, a user would provide the credit code from the credit invitation 116 to the media player 108 that operates on the client 104. In one embodiment, once the credit code has been entered into the media player 108, the media player 108 can operate to transmit the credit code to the media commerce server 102. The media commerce server 102 can then perform a credit redemption process, such as a credit redemption process discussed below with respect to FIG. 5. Once the credit amount associated with the user of the client 104 has been updated in view of the additional credit being redeemed by way of the credit invitation 116, the media player 108 can be advised of the updated credit amount available to the user. The media player 108 can optionally display the current credit amount on the display screen associated with the client 104 so that the user is able to view a visual indication of the current credit amount available to the user.

In addition to the components already discussed, the digital media purchase system 100 also includes a promotional database. The promotional database can include data to relate unique promotional codes to promotions. By unique, it is meant that a promotional code is "used" only once. Basically, however, when the promotional code is used, particular digital media content is made accessible from the digital media purchase system 100. In some examples, such digital media content is particular digital media content that is associated in the promotional database 116 with the promotional code. In other examples, such digital media content is not directly associated with the promotional code but, rather, the promotional code is associated with only a monetary value, leaving the choice of particular digital media to the user. The use of a promotional database and promotional codes is further described in pending U.S. patent application Ser. No. 11/082,207, entitled "METHOD AND SYSTEM FOR NETWORK-BASED PROMOTION OF PARTICULAR DIGITAL MEDIA ITEMS", filed on Mar. 15, 2005, which is incorporated herein by reference in its entirety for all purposes.

Figure 2A:
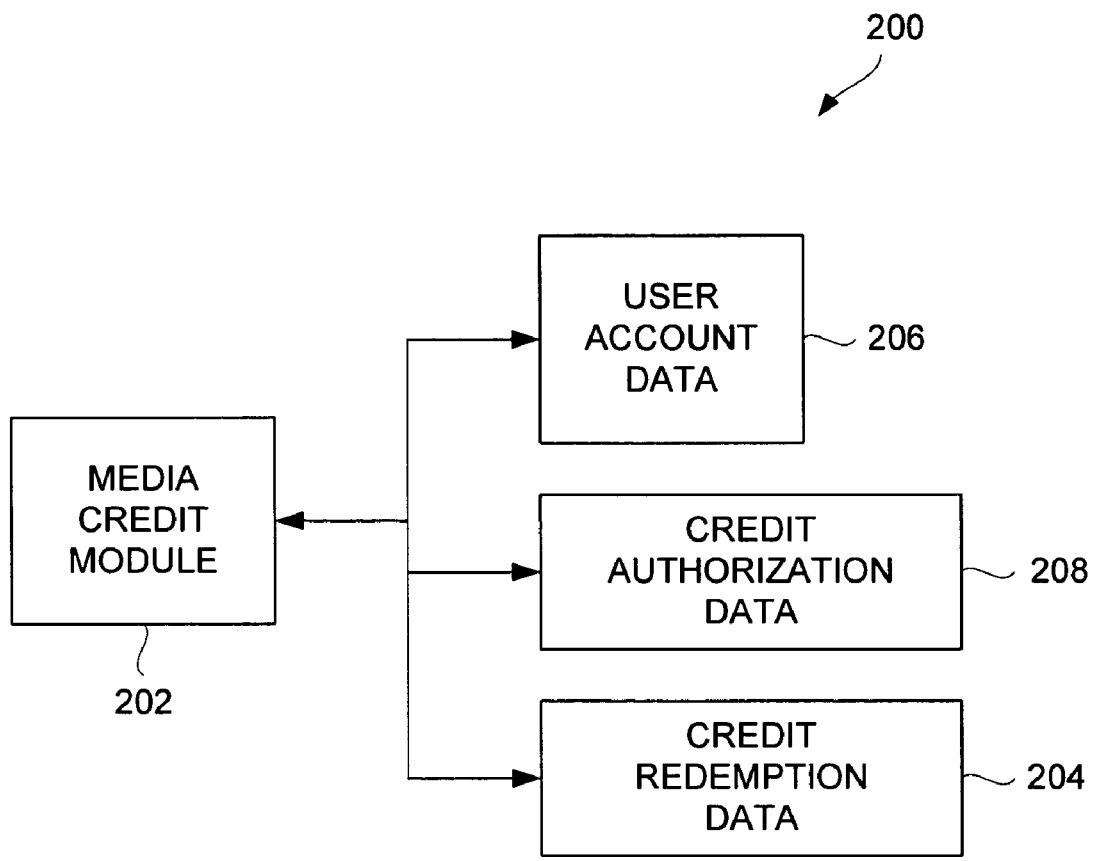
FIG. 2A is a block diagram of a media credit manager according to one embodiment of the invention.

FIG. 2A is a block diagram of a media credit manager 200 according to one embodiment of the invention. The media credit manager 200 is, for example, suitable for use as the media credit manager 114 within the media commerce server 102 illustrated in FIG. 1. The media credit manager 200 illustrated in FIG. 2A depicts functional blocks associated with credit redemption, credit management, and credit utilization. More particularly, the media credit manager 200 illustrated in FIG. 2A includes a media credit module 202. The media credit module 202 manages credit for media. In doing so, the media credit module 202 interacts with credit redemption data 204, user account data 206 and credit authorization data 208. The credit redemption data 204 is data used to validate credit redemption requests. For example, when a user receives a credit invitation (e.g., credit invitation 116) and then interacts with a local computer system (e.g., client 104)

to enter or otherwise provide a credit code, the credit code is transmitted to the media credit manager 200. The media credit module 202 can validate the credit code using the credit redemption data 204. If the credit code is determined to be valid, the media credit module 202 can allocate the credit associated therewith to a credit amount for the user that is stored in the user account data 206. Subsequently, if the user requests to purchase one or more digital media items from an online media store, such as hosted by the media commerce server 102, the media credit module 202 can determine whether the one or more digital media items to be purchased can be provided to the user at no cost or a reduced cost by the application of some or all of the credit amount associated with the user. In such cases, the media credit module 202 can determine whether the one or more digital media items that are to be purchased are authorized for credit utilization. In this case, the media credit module 202 can consult the credit authorization data 208. When the credit authorization data 208 indicates that the one or more digital media items are available for credit utilization, then the purchase cost for the one or more media items can be reduced or eliminated by the application of the credit amounts associated with the user. Typically, each credit amount would entitle the user to purchase one media item. Credits of this sort can be referred to as "item credits" or "free credits." In such a case, if the user has requested to purchase two media items that both qualify for credit utilization, then the credit amount associated with the user would be reduced by two units. Typically, the purchase cost would then be eliminated and thus the user would have acquired the two digital media items using only their accrued credit. However, credit amounts can be limited to a particular price, price range, item, item type, etc.

FIG. 2B is a diagram of a representative data table 250 according to one embodiment of the invention. The data table 250 can, for example, pertain to the credit authorization data 208 illustrated in FIG. 2A. The data table 250 can include a universal identifier (UID), a media type, price, country, and an item credit flag. The item credit flag indicates whether or not item credit can be utilized for the particular media item. In this example, only the media type "song" is potentially available for item credit. In other words, the media type "album" is a higher priced item that is not available to utilize item credits that may be available to the user. Furthermore, with respect to the media type "song", the item credit may or may not be available, depending upon the price of the media item as well as the country of the purchaser. For example, with respect to the country "Japan," purchasers residing in Japan are able to use item credits for songs that are priced at 149 and 179 yen, but unable to use item credits for songs priced at 249 yen.

In an alternative embodiment, item credits could be used with media items having a wide range of pricing. In such case, higher price items could require more than one item credit. For example, a purchaser in the United States could be permitted to purchase an album costing $9.99 using ten item credits, or to purchase a song costing $0.99 using one item credit.

Figure 3:
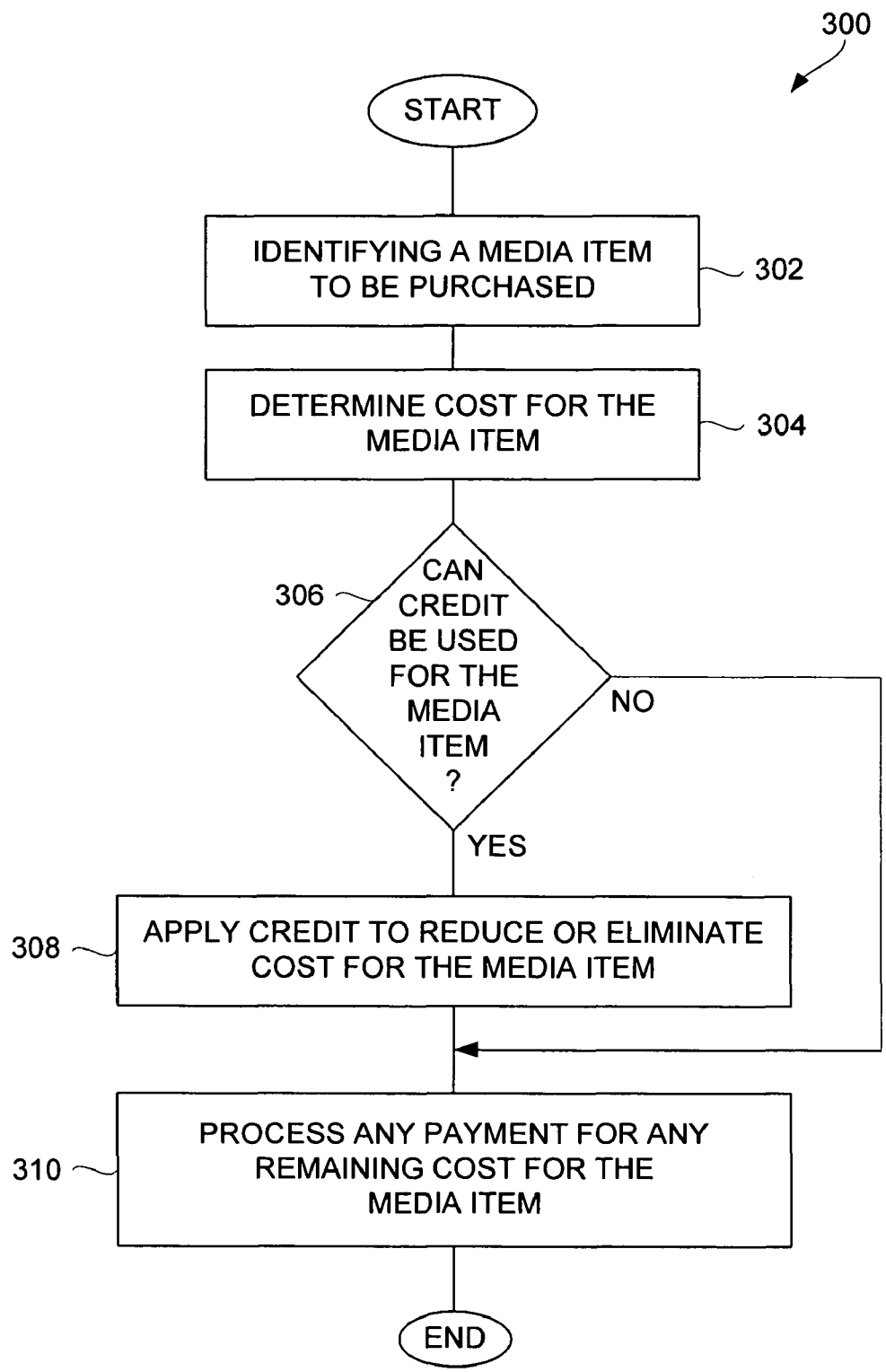
FIG. 3 is a flow diagram of a media payment process according to one embodiment of the invention.

FIG. 3 is a flow diagram of a media payment process 300 according to one embodiment of the invention. The media payment process 300 is, for example, performed by a network-based server, such as the media commerce server 102 illustrated in FIG. 1.

The media payment process 300 initially identifies 302 a media item to be purchased. The media item to be purchased can be identified by browsing or searching an online media store, such as presented by the media commerce server 102 illustrated in FIG. 1. After a media item to be purchased has been identified 302, the cost for the media item is determined 304. Typically, the cost for the media item depends upon the particular media item. Often, the same type of media item can be purchased for a similar cost. In other cases, the same type of media item can be offered at multiple different costs. Examples of different types of media items include songs, podcasts, audiobooks, slideshows, images, videos and albums. In any case, once the cost for the identified media item has been determined 304, a decision 306 determines whether credit can be used for payment for the media item. In one embodiment, the credit pertains to an item credit. With an item credit, the credit is in units of certain media items that can be acquired in exchange for a credit. However, given that a variety of different types of media items are often available to be purchased, the media system controls which media items can be acquired in exchange for a credit. The decision 306 determines whether the media item that has been identified can be acquired using credit. When the decision 306 determines that the media item can be acquired for credit, credit is applied 308 to reduce or eliminate the cost for the media item. When applying credit to reduce or eliminate the cost for the media item, the credit can be applied such that the oldest credits are utilized first. Given that the credits can expire, it is advantageous to apply older credits first. On the other hand, when the decision 306 determines that credit cannot be used for the media item, the block 308 is bypassed since no credit is available. Following the block 308, or its being bypassed, payment for any remaining cost for the media item can be processed 310. The payment, if any, being processed 310 can utilize any of a variety of payment mechanisms, including charge card, debit card, gift card, prepaid card, wire transfer, or online payment systems (e.g., PayPal). Following the block 310, the media payment process 300 is complete and ends.

Accordingly, the media payment process 300 serves to process payment for acquisition (e.g., purchase) of a media item. The payment due for the cost of the media item can be fully or partly satisfied by use of credit. The application of credit to reduce or eliminate the cost for the media item is in effect a credit payment. The processing of payment for any remaining cost of the media item, after the application of the credit, is a fee payment.

Although FIG. 3 concerns identifying and purchasing a single media item, it should be noted that the media payment process 300 can equally apply to identifying multiple media items and then purchasing such media items. Here, credit can similarly be applied (to the extent permitted) so as to reduce or eliminate the cost for the multiple media items. Accordingly, a user can purchase more than one media item at a time and use credit for all or part of the payment.

Figure 4A:
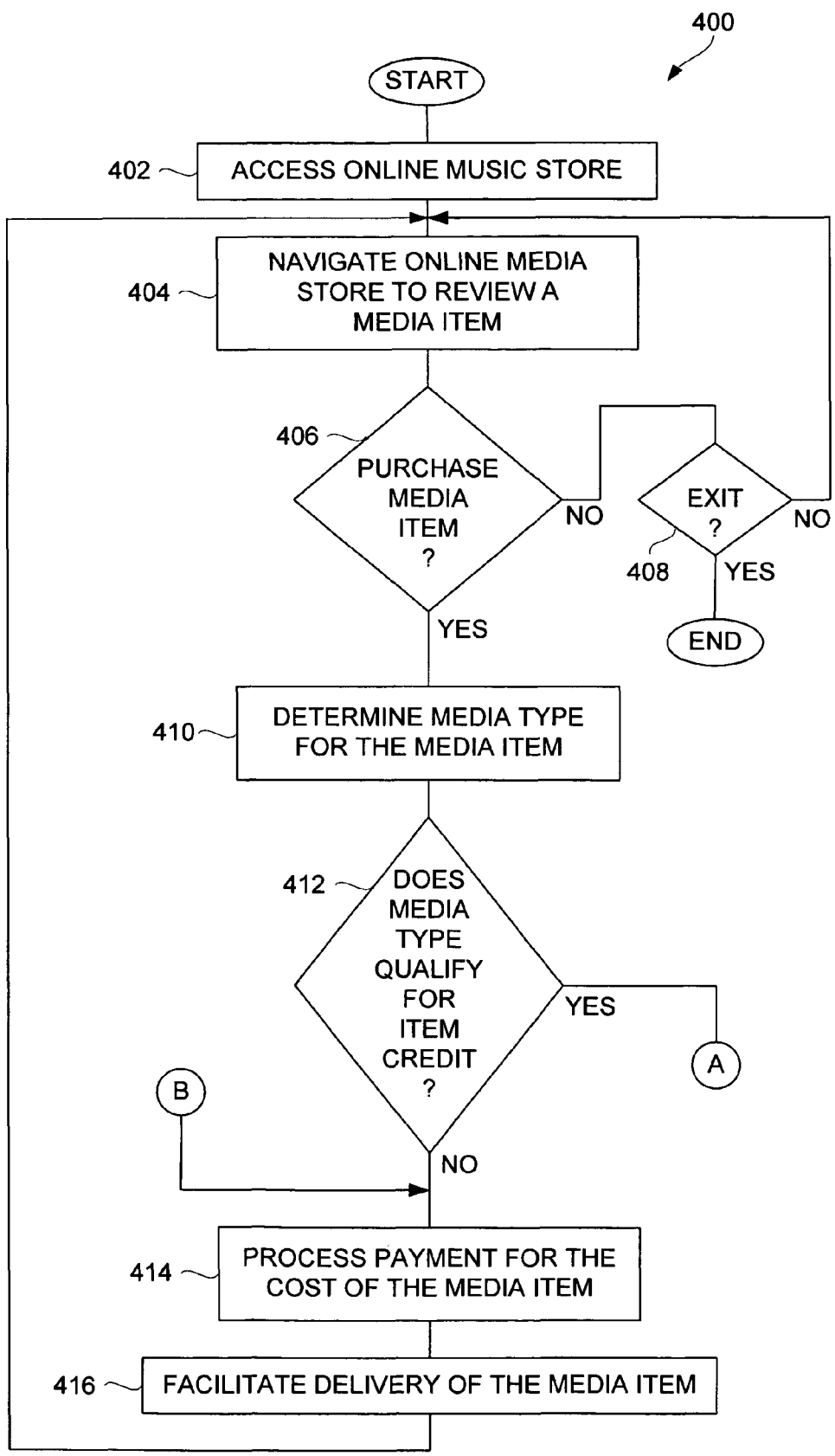
FIGS. 4A and 4B are flow diagrams of a media acquisition process according to one embodiment of the invention.
Figure 4B:
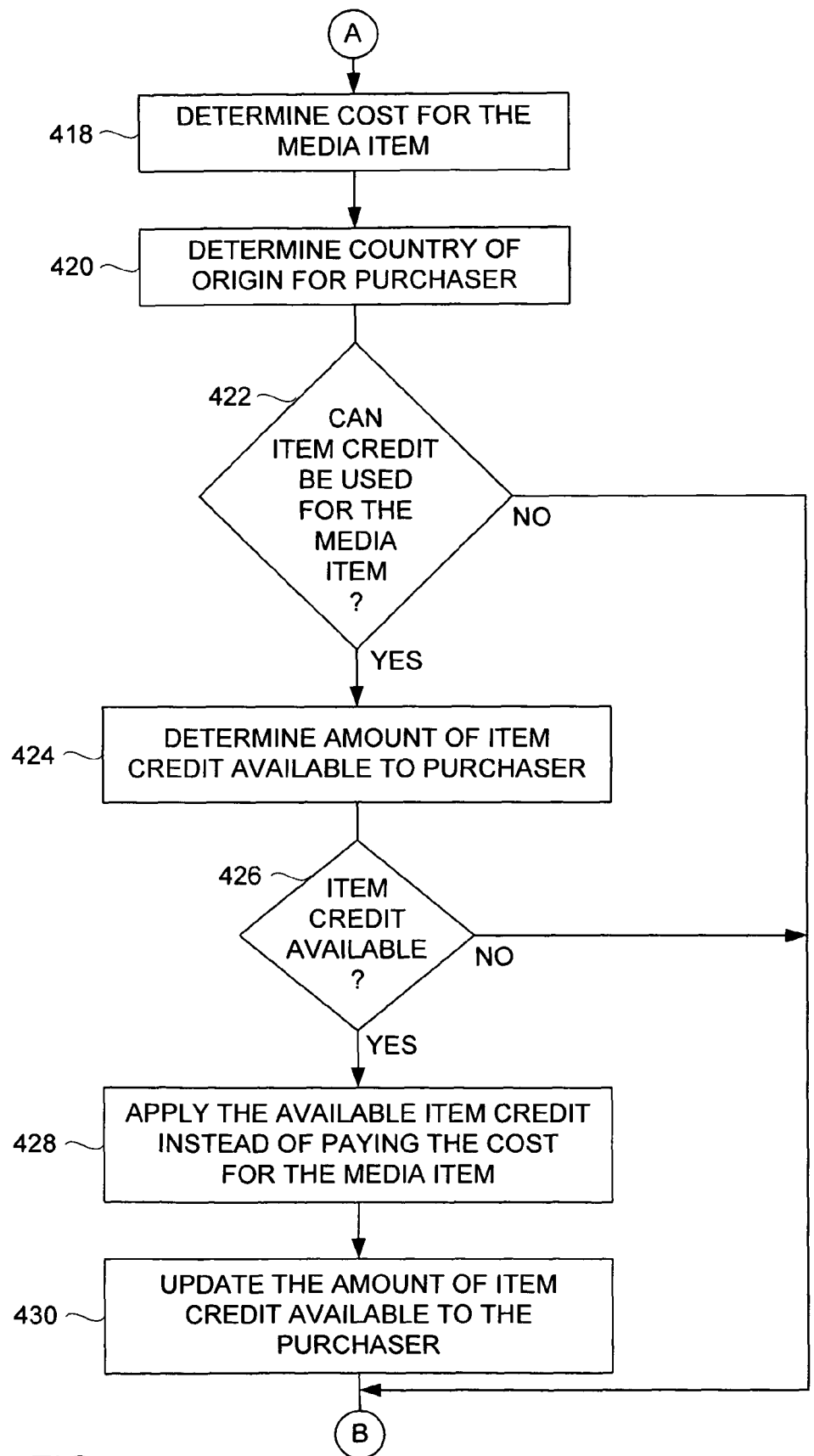

FIGS. 4A and 4B are flow diagrams of a media acquisition process 400 according to one embodiment of the invention. The media acquisition process 400 is, for example, performed by a network-based server, such as the media commerce server 102 illustrated in FIG. 1.

The media acquisition process 400 initially accesses 402 an online music store. For example, the online media store can be hosted by the media commerce server 102 illustrated in FIG. 1. Then, the media acquisition process 400 enables a user to navigate 404 the online media store to review a media item. The online media store can offer many different media items of one or more different media types. Hence, the navigation 404 enables the user to search, browse or otherwise locate at least one media item of interest. Typically, the media item of interest would have associated information that would be presented (e.g., displayed) for the user and thus enable the user to review the media item and determine whether they would like to purchase the media item.

After the navigation 404 to a media item of interest has been performed, the media item can be purchased. Typically, a user can request to purchase a media item once having navigated to review information concerning the media item. Hence, a decision 406 determines whether the media item is to be purchased. When the decision 406 determines that the media item is not to be purchased, a decision 408 determines whether the media acquisition process 400 should exit. When the decision 408 determines that the media acquisition process 400 should exit, then the media acquisition process 400 ends. On the other hand, when the decision 408 determines that the media acquisition process 400 should not exit, the processing returns to repeat the block 404 and subsequent blocks so that the user can continue to interact with the online media store.

Alternatively, when the decision 406 determines that the media item is to be purchased, a media type for the media item is determined 410. For example, the media type could be one of a song, album, image, slideshow, audiobook, podcast, or video. Next, a decision 412 determines whether the media type for the media item qualifies for item credit. Here, certain media types are approved for item credit, while other media types are not approved for item credit. Hence, the decision 412 determines whether the media type for the media item qualifies for item credit.

When the decision 412 determines that the media type for the media item does not qualify for item credit, payment for the cost of the media item is processed 414. For example, the payment can be the monetary transfer to a credit card, bank account or other electronic payment means. After the payment has been processed 414, the media acquisition process 400 facilitates 416 delivery of the media item. Following the block 416, the media acquisition process 400 returns to repeat the block 404 and subsequent blocks so that additional navigation with respect to the online media store can be performed so that a user is able to review and purchase additional media items in a similar fashion.

On the other hand, when the decision 412 determines that the media type for the media item does qualify for item credit, then the cost for the media item is determined 418. The country of origin for the purchaser of the media item is also determined 420. Next, a decision 422 determines whether item credit can be used for the media item. In this embodiment, the decision 422 is based on the cost for the media item as well as the country of purchase. In other words, the determination of whether credit can be used can be dependent not only on the cost of the media item but also the country of origin for the purchaser. For example, in the representative data table 250 illustrated in FIG. 2B, item credit is permitted for only certain media items depending on its cost and the country from which it is being purchased. More generally, however, it should be noted that the decision 422 can use one or more of cost and country of purchase alone or in combination, or in further combination with the media type, when determining whether item credit can be used.

When the decision 422 determines that item credit can be used for the media item, an amount of item credit available to the purchaser is determined 424. In one embodiment, a user account associated with the purchaser can be queried to determine the amount of item credit available to the purchaser. In one embodiment, the item credit can expire if not used in a timely manner. Next, a decision 426 determines whether item credit is available to the purchaser. In other words, the decision 426 determines whether the purchaser has one or more item credits. When the decision 426 determines that item credit is available to the purchaser, then the available item credit is applied 428 instead of paying the cost for the media item. In one embodiment, when applying credit to reduce or eliminate the cost for the media item, the available item credit can be applied such that the oldest credits are utilized first. Then, the amount of item credit available to the purchaser is updated 430. In particular, the amount of item credit available to the purchaser would be reduced given that at least a portion of the available item credit for the purchaser has been applied 428. In one embodiment, the available item credit indicates the number of qualifying media items that can be obtained without cost. Hence, the amount of item credit available to the purchaser would be updated 430 by reducing the amount of item credit by one for each media item being acquired using the item credit. For example, if the purchaser has available item credit in the amount of five (5) units, the amount of item credit would be reduced by the amount of one (1) unit after the application 428 of the item credit to pay the cost for the one qualifying media item. As a result, the amount of item credit available to the purchaser would thus be reduced so that the amount of item credit thereafter available to the purchaser would be four (4) units. Following the block 430 or following the decision 422 when item credit cannot be used, the media acquisition process 400 returns to the block 414 for payment processing of any remaining cost.

As noted above, a user of a electronic device, such as the client 104 illustrated in FIG. 1, can obtain a credit invitation, such as the credit invitation 116 illustrated in FIG. 1, from any of a variety of different sources. Once the user has obtained the credit invitation, the user can redeem the credit invitation for the offered credit. For example, the credit invitation can be redeemed at an online media store via a computing device that can connect to a network that has access to the online media store.

Figure 5:
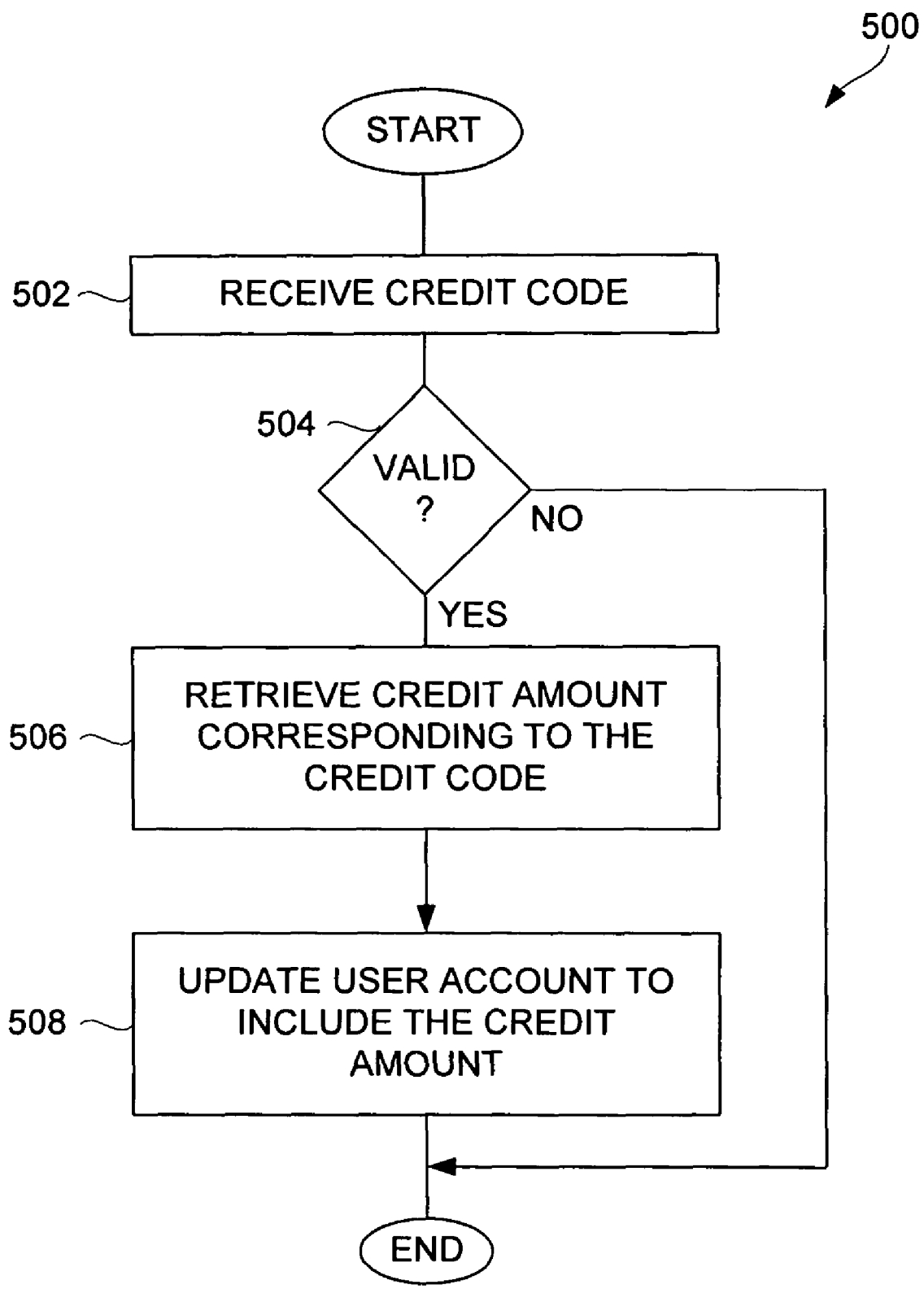
FIG. 5 is a flow diagram of a credit redemption process according to one embodiment of the invention.

FIG. 5 is a flow diagram of a credit redemption process 500 according to one embodiment of the invention. The credit redemption process 500 is, for example, performed by a remote server, such as the media commerce server 102 illustrated in FIG. 1.

The credit redemption process 500 initially receives 502 a credit code. The credit code can be provided by a user. For example, a user can receive a credit code by way of a credit invitation. As previously noted above, the credit invitation can take a variety of different forms or formats, including a physical card, a bottle cap, an electronic mail, etc. Regardless of the form or format, the credit invitation includes a credit code that can be utilized by a user. The credit redemption process 500 can receive 502 the credit code by either a user entering the credit code into a dialog box displayed on a display screen of a computing device (e.g., the client 104), or by forwarding or providing an electronic mail including the credit code to the remote server performing the credit redemption process 500. After the credit code has been received 502, a decision 504 determines whether the credit code is valid. The credit code may be improperly entered, may be fraudulent, or may have expired. Hence, the decision 504 determines whether the credit code is deemed valid such that it entitles the user to one or more credits, such as item credits which can also be referred to as free credits. When the decision 504 determines that the credit code is valid, then a credit amount corresponding to the credit code is retrieved 506. Not all credit invitations entitle its user to the same amount of item credit. Hence, the appropriate credit amount is retrieved 506. In one embodiment, the credit code is obtained from a media credit manager, such as the media credit manager 114 illustrated in FIG. 1 or the media credit manager 200 illustrated in FIG. 2. For example, the appropriate credit amount corresponding to a particular credit code can be retrieved from credit redemption data 204 which can be stored in a database (e.g., credit redemption database) or other electronic file. After the credit amount has been retrieved 506, the user account corresponding to the user is updated 508 to include the credit amount. For example, if previously the user account indicated that the user had no credits, after the credit redemption of a credit code entitling the user to five (5) credits, the user account would indicate that the credit amount for the user is five (5) items (or five credits).

Figure 6:
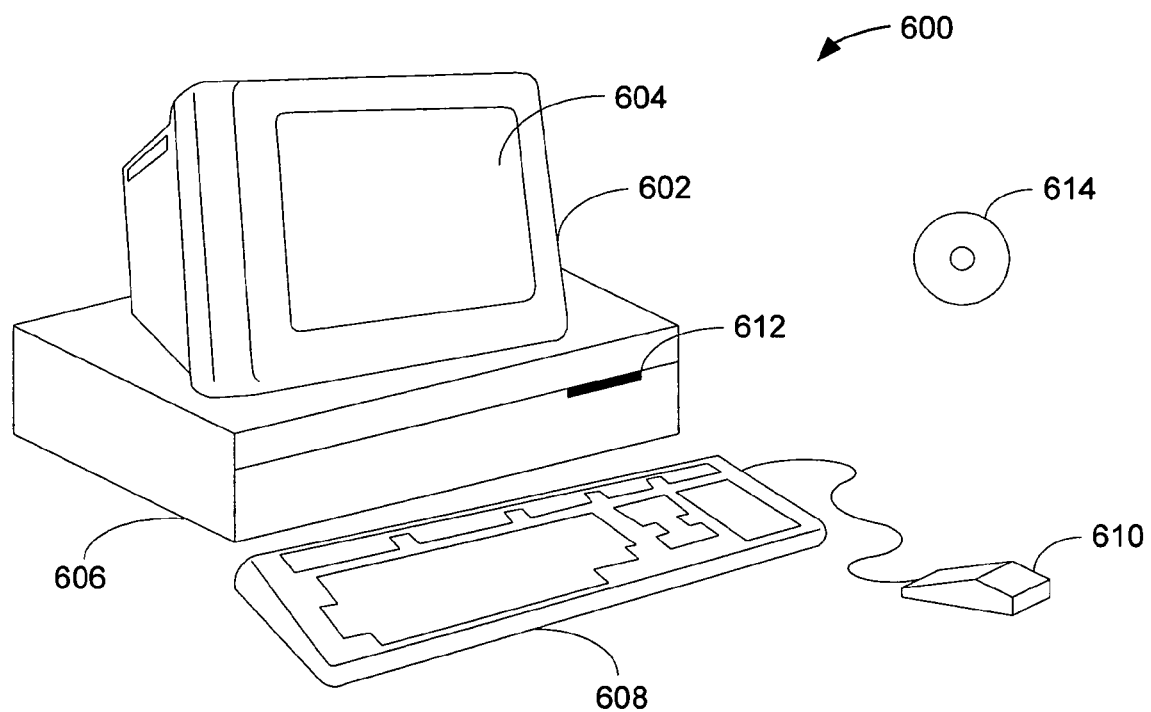
FIG. 6 shows an exemplary computer system suitable for use with the invention.

FIG. 6 shows an exemplary computer system 600 suitable for use with the invention. The computer system 600 includes a display monitor 602 having a single or multi-screen display 604 (or multiple displays), a cabinet 606, a keyboard 608, and a mouse 610. The cabinet 606 houses a drive 612, such as for receiving a CD-ROM 614, a system memory and a hard drive (not shown) which may be utilized to store and retrieve software programs incorporating computer code that implements the present invention, data for use with the invention, and the like. Although the CD-ROM 614 is shown as an exemplary computer readable medium, other computer readable media including floppy disk, tape, flash memory, system memory, and hard drive may be utilized. Additionally, a data signal embodied in a carrier wave (e.g., in a network including the Internet) may be the computer readable medium.

The invention can be implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that credit, such as item credit, can be controllably applied to media items of different costs/prices. Another advantage of the invention is that credit can also be controllably applied differently in different countries.

The various aspects, embodiments, implementations or features of the invention can be used separately or in any combination.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for acquiring a media item from an online media store using a credit, said method including at least:
    (a) identifying a media item being purchased by a purchaser, the media item having a purchase cost associated therewith;
    (b) determining whether the media item is permitted to be acquired using an item credit, the determining being based on at least the purchase cost and a country of origin for the purchaser, wherein said determining (b) includes at least:
        (b1) determining a media type for the media item; and
        (b2) determining whether the media type for the media item is permitted to be acquired using an item credit;
    (c) determining whether the purchaser has at least one item credit available at the online media store; and
    (d) thereafter applying the item credit associated with the purchaser so as to reduce or eliminate the purchase cost of the media item when said determining (b) determines that the media item is permitted to be acquired using an item credit.

2. A method as recited in claim 1, wherein said determining (b) includes at least:
    determining a country of origin for the purchaser; and
    determining whether the media type for the media item is permitted to be acquired using an item credit based on at least the purchase cost, the media type and the country of origin.

3. A method as recited in claim 1, wherein said determining (b) accesses a data table storing at least the purchase cost for the media item to determine whether the media item is permitted to be acquired using item credits.

4. A method as recited in claim 1, wherein said determining (b) accesses a data table storing at least the purchase cost for the media item to determine whether media items having such a purchase cost are permitted to be acquired using item credits.

5. A method as recited in claim 4, wherein the data table is part of a database.

6. A method as recited in claim 1, wherein media items of different purchase costs can be authorized for item credits on a per cost basis.

7. A method as recited in claim 1, wherein media items of the same media type have two or more different purchase costs, and wherein the two or more different purchase costs can be independently authorized for item credits.

8. A method as recited in claim 7, wherein said determining (b) includes at least:
    (b1) determining a country of origin for the purchaser; and
    (b2) determining whether the media item is permitted to be acquired using an item credit based on at least the purchase cost and the country of origin.

9. A method as recited in claim 7, wherein said determining (b) includes at least:
    determining a country of origin for the purchaser; and
    determining whether the media type for the media item is permitted to be acquired using an item credit based on at least the purchase cost, the media type and the country of origin.

10. A method as recited in claim 1, wherein said method further comprises:
    (e) reducing the item credit available for the purchaser after said applying (d) of the item credit.

11. A method as recited in claim 10, wherein said method further comprises:
    (f) receiving a credit code associated with a credit invitation; and
    (g) increasing the item credit available for the purchaser based on an amount of credit associated with the credit code.

12. A method as recited in claim 11, wherein said determining (b) includes at least:
    determining a country of origin for the purchaser; and
    determining whether the media item is permitted to be acquired using an item credit based on at least the purchase cost and the country of origin.

13. A non-transitory computer readable medium including at least computer program code stored thereon for acquiring a digital media asset from a network-based media server using a credit, said computer program code including at least:
    computer program code for identifying a digital media asset being purchased by a purchaser, the digital media asset having a purchase cost associated therewith;
    computer program code for determining whether the digital media asset is permitted to be acquired using an item credit, wherein the determining is based on at least the purchase cost and a origin of country of the purchaser, wherein said computer program code for determining includes at least:
        computer program code for determining a media type for the media item; and
        computer program code for determining whether the media type for the media item is permitted to be acquired using an item credit;
    computer program code for determining whether the purchaser has at least one item credit available at the network-based media server; and
    computer program code for thereafter applying the item credit associated with the purchaser so as to reduce or eliminate the purchase cost of the digital media asset when it is determined that the digital media asset is permitted to be acquired using an item credit.

* * * * *